United States Patent [19]

Luck

[11] 4,171,151
[45] Oct. 16, 1979

[54] FOOD CARRIER

[76] Inventor: Thomas J. Luck, George Lamb Rd., Leyden, Mass. 01337

[21] Appl. No.: 891,130

[22] Filed: Mar. 27, 1978

[51] Int. Cl.² .......................................... A47B 77/08
[52] U.S. Cl. .................................. 312/236; 312/214; 312/198; 211/181
[58] Field of Search ............. 312/236, 214, 270, 352, 312/108, 198, 244, 233; 211/133, 181; 108/91, 53.3

[56] References Cited

U.S. PATENT DOCUMENTS

| | | | |
|---|---|---|---|
| 789,125 | 5/1905 | Emerson | 211/181 |
| 2,290,307 | 7/1942 | Wicker | 312/244 |
| 2,558,611 | 6/1951 | Emmart | 211/181 |
| 2,815,649 | 12/1957 | Angelus et al. | 312/214 |
| 2,897,034 | 7/1959 | Kalen | 312/244 |
| 3,050,073 | 8/1962 | McMillan | 211/181 |
| 3,222,114 | 12/1965 | Stentz | 312/236 |
| 3,257,154 | 6/1966 | Lewis | 312/198 |
| 3,261,650 | 7/1966 | Stromqvist | 312/236 |
| 3,275,393 | 9/1966 | Stentz et al. | 312/236 |
| 3,992,069 | 11/1976 | Kitterman | 312/236 |
| 4,042,107 | 8/1977 | Kendig | 108/53.3 |

*Primary Examiner*—Victor N. Sakran
*Attorney, Agent, or Firm*—Salter & Michaelson

[57] ABSTRACT

A carrier for both hot and cold foods is disclosed in which a container having insulated top, bottom, rear and sidewalls is provided with separate but insulated side-by-side compartments, each having an open front in turn adapted to be closed by hinged insulated doors in contact with a peripherally mounted gasket. The internal configuration of the compartments is tapered from front to rear so as to accommodate the wedging reciept of a rack defining a plurality of shelves on which food serving trays may be disposed. Each rack is of a unique configuration and is especially adapted to hold either hot or cold food containers or trays.

10 Claims, 6 Drawing Figures

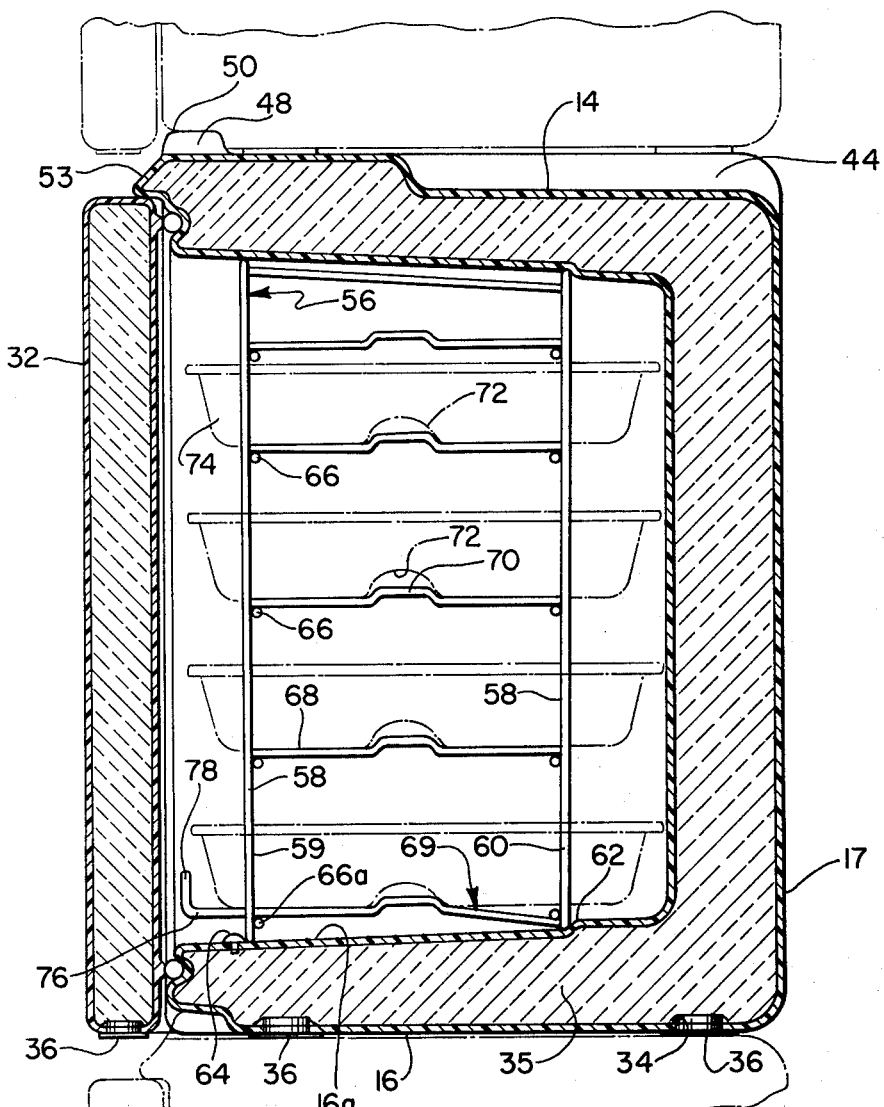
FIG. 4
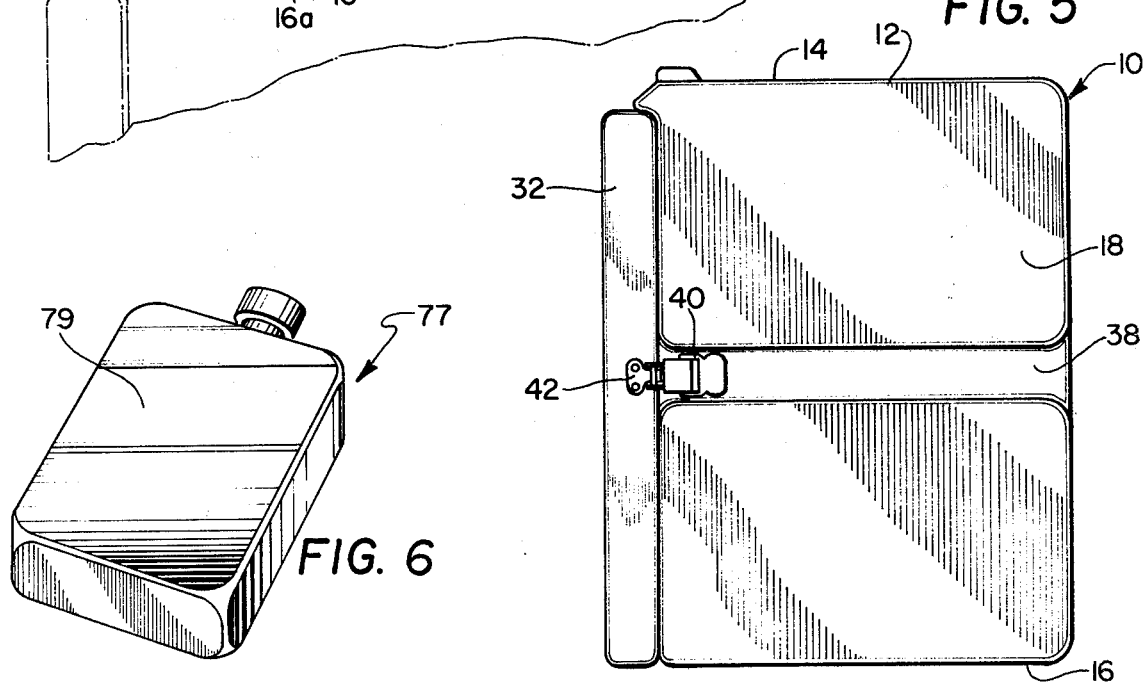
FIG. 5
FIG. 6

FOOD CARRIER

BACKGROUND AND SUMMARY OF THE INVENTION

This invention relates to a carrier for food materials and especially to a compartmented container particularly designed for ease in transporting meals prepared at a central point to persons having need for such meals and located some distance from the preparation site. A particular use for the subject invention is accordingly the transportation of preportioned meals prepared and distributed to the disabled, elderly or shut-in and would include such programs as "Meals on Wheels," as well as various institutional uses.

Containers utilized for such programs previously generally lacked several desirable attributes for accomplishing the transporting of both hot and cold nutritious meals in a safe, efficient and trouble-free manner. Thus, carriers for the transportation of home or other off-site delivered meals were often too heavy, too bulky, too fragile, presented racks which could move relative to the carrier thus causing slippage or spillage of the meals, and were additionally not adapted to carry hot and cold foods simultaneously. Further desirable features not incorporated in prior art containers utilized for this purpose include stability when stacking one on top of another. Accordingly the need exists for a special purpose carrier for the simultaneous transfer of both hot and cold food in a safe, convenient manner which further lends itself to the presentation of both wholesome, nutritious and appetizing foods upon delivery.

It is accordingly an object of the present invention to provide a carrier for transporting prepared meals to shut-ins and/or to various institutions where meals are served which is adapted to simultaneously carry both hot and cold foods, and which is of lightweight durable construction and of a configuration so as to be easily handled by non-professional volunteers often participating in feeding programs of the type indicated.

A further object of the present invention is the provision of a carrier of the aforementioned type in which racks of distinctive configuration are presented within separated compartments in such a manner as to lend themselves to the arrangement of food and food trays therein wherein the racks are wedgingly received within the compartments so as to form a secure, non-movable fixed support for food trays and the like.

Another object is the provision of specially designed heating and cooling units adapted to be positioned in the separated hot and cold compartments of the carrier to maintain the contents of said compartments hot and cold for extended periods of time.

These and other objects of the invention are accomplished by the provision of a lightweight container shell having insulated top, bottom and sidewalls defining a pair of side-by-side interior compartments each having an open front and insulated doors hingedly connected to the shell for closing said open fronts in a generally airtight manner. The compartments are inwardly tapered front to rear and a stiff wire-like rack having a peripheral supporting frame and defining a plurality of vertically spaced shelves for receipt of food storage trays and the like is wedgedly received in each compartment by co-action of said frame against inner portions of said top, bottom and sidewalls.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 4 is a section taken on line 4—4 of FIG. 2, with additional carriers above and below shown in broken lines to illustrate how the units stack;

FIG. 5 is a side elevational view thereof; and

FIG. 6 is a perspective view of a heating unit used with the present invention.

DESCRIPTION OF THE INVENTION

Figure 1:
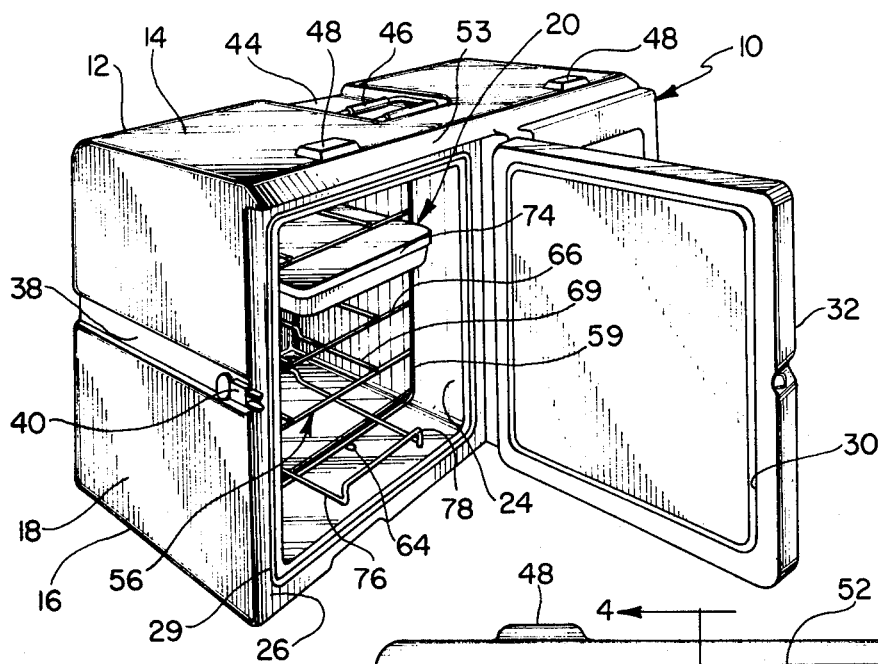
FIG. 1 is a front perspective view of the carrier of the present invention, with one of the compartment doors in open position.
Figure 2:
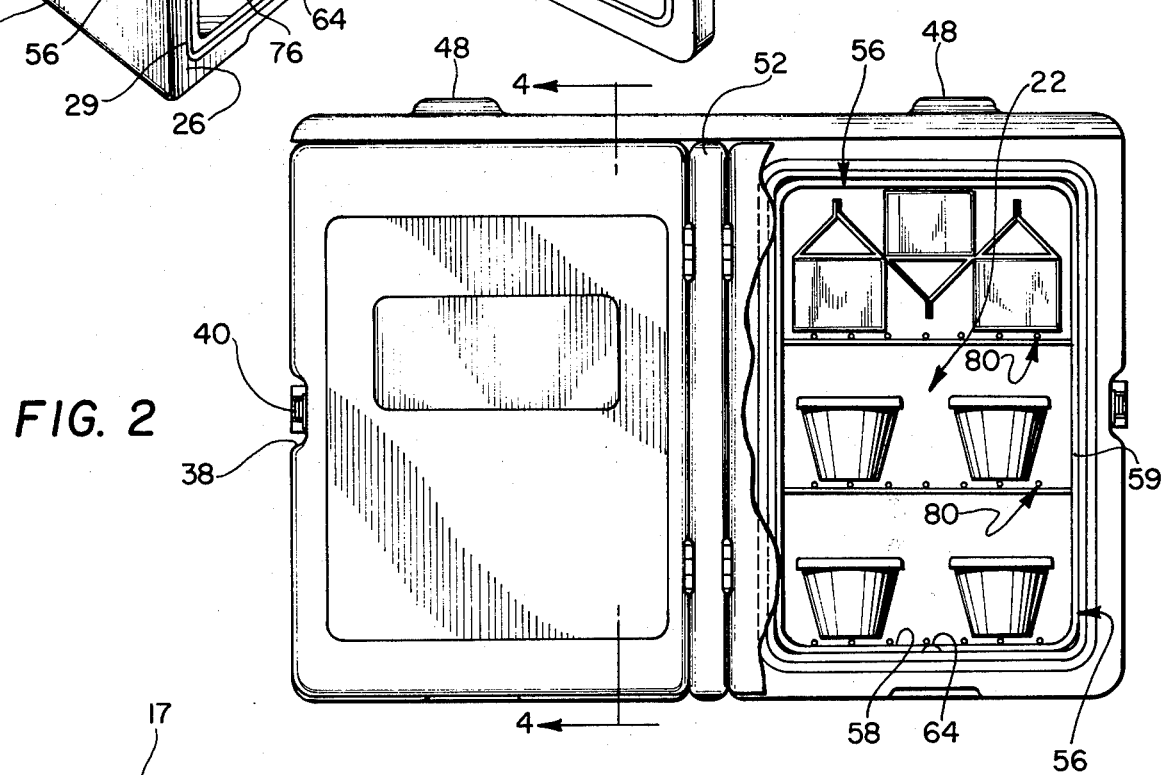
FIG. 2 is a front elevational view thereof, with a portion broken away for purposes of illustration.
Figure 3:
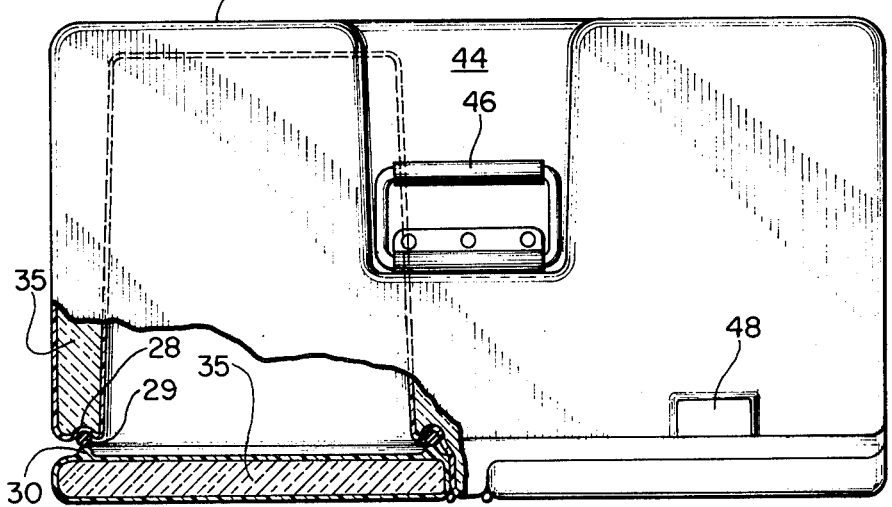
FIG. 3 is a top plan view thereof.

Referring now to the drawings and particularly FIGS. 1 and 2 thereof, the carrier 10 of the present invention includes a container shell 12 having top, bottom, rear and sidewalls 14, 16, 17 and 18 respectively. The container shell 12 is generally integrally formed from lightweight, tough engineering type plastics such as high density polyethylene, polypropylene, ABS and the like. The walls, that is the top, bottom, rear and sidewalls, cooperatively define a pair of interior compartments 20 and 22 disposed in side-by-side relationship and separated from each other by a separating wall 24. Each compartment includes a peripheral front face 26 which defines the extent of its open front and in which a peripheral groove 28 is integrally molded. The groove is adapted to receive a gasket 29 of soft, rubberlike or plastic material against which an outwardly projecting peripheral bead 30 disposed on the front face of a door 32 is adapted to sealingly engage.

The door as well as the remaining walls of the container are of hollow double wall construction and are provided at the bottoms thereof with an interior access opening or hole 34 which enables the hollow interiors to be filled with an insulated foam material 35 such as polyurethane and the like. The openings 34 are then covered by protective snap-in plugs 36 formed of relatively soft rubber or other resilient material and thus serve not only to cover the foaming holes 34 but to additionally serve as protective mounts and anti-slide devices so that the bottom of the container shell 12 will not mar or slide relative to the surfaces on which it is placed.

Each of the sidewalls 18 is centrally recessed so as to provide a channel 38 in which a latch 40 may be mounted so as to be flush with remaining portions of the sidewalls 18. The latch 40 is adapted to engage a striker plate 42 mounted on each of the doors 32 as best shown in FIG. 5 of the drawings and in this way enable the doors 32 to be forced into relatively airtight sealing contact with the front face of each compartment. Similarly the top wall 14 is provided with a recessed channel 44 in which a carrying handle 46 is disposed. Such handle is spring urged to non-use positions so as to be disposed within the channel 44 and accordingly underlie remaining portions of the top surface 14.

Additionally the top surface 14 is provided with a pair of upwardly directed spaced lugs 48 which are adapted to engage with similarly formed recesses 50 formed in the bottom wall 16, as best shown in FIG. 4 of the drawings. The interlock between the lugs 48 and the recesses 50 enables the containers 10 to be stacked vertically relative one another and retain lateral stability. It should also be noted that the bottom of the doors 32 are disposed a slight distance above the bottom of the shell 12 such that when a door is outwardly pivoted, it will not contact the surface on which the container 10 is resting. The doors 32 are hinged to an outwardly extending centrally positioned post 52 which is formed integrally with the shell 12 and is actually its forward end of central partition 24. As will be seen most clearly in FIGS. 1 and 4, top surface 14 terminates at its front end in a forwardly extending ledge 53 which at least partially overlies the top surface of doors 32, thus adding further structural support to the door mount assembly when the doors are closed, and specifically ledge 53 functions to absorb some of the impact if the unit 10 should accidentally be dropped.

It will thus be apparent that from the above description, a sturdy, lightweight, rugged, and easily transportable carrier is presented. The carrier is also especially adapted to carry both hot and cold foods simultaneously inasmuch as it provides for side-by-side separately insulated compartments. It should recognized, however, that although the container is especially adapted for this purpose and is so described, that alternatively both of the compartments could be utilized for either hot or cold food. The manner in tailoring a particular compartment for use in the receipt of either cold or hot food lies in the configuration of a rack 56 adapted for disposition therein. Accordingly either compartment may receive a rack 56 configured for either hot or cold foods.

The rack shown in FIG. 1 that is disposed within the left hand compartment 20 is especially adapted for containment of standard aluminum hot food container trays whereas the rack shown within the right hand compartment 22 (FIG. 2) is especially configured to contain cold foods such as cartons of milk, salads, desserts and the like. Both of the racks 56 are of similar construction and include a common frame 58 comprising a pair of opposed front and rear frame segments 59 and 60, respectively. All of said frame segments extend completely and continuously around their respective racks so as to integrate and rigidify same, and so as to make snug engagement with the interior walls of the compartment in which they are disposed. The rear frame segments 60 are of a slightly lesser peripheral dimension than that of the front segments 59, while the inner portions of the top, side, and bottom walls forming the interior of each compartment are similarly tapered to snugly accommodate the configuration of the frames 56. Additionally, the top and bottom walls have inwardly directed shoulders or ledges 62 against which the rear frame segments 60 abuttingly contact so as to prevent the rack from being wedged too far back into the compartment so as to become stuck therein which would make it difficult to remove the racks when desired, such as for cleaning and the like. The peripheral extent of both of the frame segments 59 and 60 accordingly contact interior portions of the compartment in such a manner so as to be snugly and frictionally received thereby. The bottom wall of each compartment is additionally provided with an upstanding bead or button 64 disposed centrally of the forward edge thereof. The bead (which may simply be a round headed screw threaded into interior bottom wall 16*a*) is adapted to abuttingly engage a lower portion of the front segment 59 in such a manner that the rack 56 must be forced over such bead in order to position the rack properly in the compartment. Thus the bead forms a detent which insures the retention of the rack in the desired position within the compartment. The rack may also be easily removed when desired by forcing the segments 59 over the detent 64 and then pulling the racks forwardly until they are free of their respective compartments.

Turning now to FIGS. 1 and 4 particularly, the configuration of the rack 56 designed for the receipt of hot food is disclosed. Therein side-to-side connecting rods 66 are disposed horizontally between the vertical runs of the front and rear segments 59 and 60 respectively, there being four such rods between the rear segments 60 and five between the front segments 59. This is so that front to rear connecting rods 68 attached to and extending between the cross rods 66 may be horizontally disposed, it being noted that the bottom front cross rod 66*a* is in horizontal registry with the portion of interior bottom wall 16*a* adjacent ledge 62, while the remaining front and rear cross rods 66 are in substantial horizontal registry with each other, as shown most clearly in FIG. 4. Thus it will be seen that the securement of rods 66 and 68 to each other, and to frame segments 59, 60, as by welding or the like, results in the assembly that defines the racks 56, with the horizontally aligned front and rear cross rods 66 defining a plurality of horizontally disposed shelves 69 for receiving the food trays or containers thereon.

Each of the front to rear connecting rods 68 is further provided with an upwardly directed generally U-shaped bump 70 centrally thereof which is adapted to interengage in a corresponding generally similarly shaped depression 72 which is present in the standard three-part aluminum trays 74 utilized for containment of hot foods. In this manner then the interfit between the bump 70 and the depression or recess 72 prevents the trays from sliding with respect to the front and rear walls of the compartment should the container be inadvertently tipped, dropped, etc. Additionally, the lowest shelf 69 is provided with a generally U-shaped extension 76 (see FIG. 1) having an upwardly directed lip 78 such that a heating unit of the type shown at 77 (FIG. 6) may be disposed thereon and positioned with respect to the compartment 22 so that the heat evenly moves upwardly through the shelves 69 so as to maintain the heat of the food contained in the separate trays 74.

Heating units of this type are known and may employ materials such as stearic acid which turns to liquid upon heating and solidifies upon cooling just below desirable hot food preservation temperatures somewhat below 160° F. A closed metallic case 79 may be used to contain such material. When such heat unit is placed within the compartment 20, the heat is radiated into the container as the material cools and solidifies. Stearic acid solidifies at about 156° F. and thus is well suited for this purpose. Thus the food contained within the trays 74 is maintained at a warm temperature range until all the heat of fusion has been released. Food contained in this manner has been found to be adequately warm upon serving after transportation periods of up to six hours and since the unit 77 will not elevate temperatures into the cooking range, i.e. above 170° F., there will be no breakdown of nutrients, texture or taste of the stored food.

Turning now to FIG. 2, the particular configuration of the rack designed for the containment of cold food is shown. Therein the front and rear segments 59 and 60 of the frame 58 are provided with three more conventional shaped shelves 80 in the form of a crisscross network and thus are more particularly adapted for the storage of cold foods such as cartons of milk shown on the top shelf 80, and salad and dessert cups carried on the bottom two shelves. It should be brought out, however, that the frame structure 58 of both racks 56 whether designed especially to carry hot or cold foods is basically the same and such structure enables the rack to be pressed inwardly so as to frictionally engage against all the interior sidewalls of the compartment until abutment is made with the ledges 62, and proper snap-fit engagement has been made with detents 64. Since the hot and cold food racks have the same basic outer frame configuration, either rack can be slidably mounted in either compartment of the carrier; i.e., either compartment can function as the hot foor or cold food compartment, depending on which rack is slidably positioned therein. Also, the cold food compartment can be maintained cold by placing any desired refrigerant therein, such as dry ice or the like. Since the two compartments 20, 22 are completely insulated from each other, hot or cold units used in either compartment will not affect the other compartment.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A carrier for transporting prepared meals and the like comprising, a lightweight container shell having insulated top, bottom, rear and sidewalls defining at least one interior compartment having an open front, an insulated door hingedly connected to said shell for closing said open front and sealing means between the front wall of said container shell and said door to provide a substantially airtight seal therebetween, said compartment inwardly tapered from the front to the rear thereof, and a stiff wire-like rack having a peripheral supporting frame and defining a plurality of vertically spaced shelves for receipt of food storage trays wedgingly received in said compartment, said compartment having means for limiting the depth to which said rack may be forced rearwardly within said compartment and means at the forward end of said compartment for releasably maintaining said rack in said compartment, said means for limiting the depth position of said rack comprising a pair of opposed ledges inwardly directed from said top and bottom walls and adapted to contact said frame so as to space said frame from said rear wall.

2. The food carrier of claim 1, said means for maintaining said rack in said compartment comprising a button disposed at the forward portion of said bottom and upstanding therefrom, said frame adapted for disposition between said button and said lower ledge.

3. A carrier for transporting prepared meals and the like comprising a lightweight container shell having insulated, top, bottom, rear and side walls, an insulated partition dividing said container into two completely separate side-by-side insulated compartments, a pair of insulated doors hingedly mounted on the front of said containers covering the front of each of said compartments, said compartments each being inwardly tapered from front to rear so as to define a wider front portion and a narrower rear portion, and a stiff wire-like rack having a peripheral supporting frame and defining a plurality of vertically spaced shelves positioned within each said compartment, said rack being dimensioned so as to be freely insertable through the wider front portion of its respective compartment but wedgingly received by the narrower rear portion thereof.

4. A carrier for transporting prepared meals and the like comprising a lightweight container shell having insulated, top, bottom, rear and side walls, an insulated partition dividing said container into two completely separate side-by-side insulated compartments, a pair of insulated doors hingedly mounted on the front of said containers covering the front of each of said compartments, said compartments each being inwardly tapered from front to rear so as to define a wider front portion and a narrower rear portion, said container shell, partition and doors being of hollow double wall construction with insulation material located therein, openings on the bottom of aid container shell through which said insulation material is inserted, and detachable means covering said openings, said cover means simultaneously functioning as supporting feet for said carrier and being constructed of a frictional non-slip material.

5. The carrier of claim 4 further characterized in that said doors are hingedly attached to the outer end of said partition, and latching means secured to walls of said container for releasably maintaining said doors in closed position.

6. The carrier of claim 3 further comprising detent means adjacent the forward end of each compartment cooperating with said racks for releaseably maintaining the latter in said compartments.

7. The carrier of claim 3 further comprising means in each said compartment spaced forwardly from the rear wall thereof for positively limiting the depth to which said racks may be forced rearwardly within their respective compartments.

8. The carrier of claim 4 further characterized in that the front peripheral face surrounding each said compartment has a continuous peripheral groove, a gasket disposed in said grooves, said doors having a peripheral bead on their inner surfaces adapted to contact said gaskets in sealing engagement when said doors are in their closed position.

9. The carrier of claim 3 further characterized in that the frame of said rack includes spaced forward and rear portions interconnected by pairs of vertically spaced horizontally disposed rods, each pair of rods having aligned upwardly directed projections adapted to interengage with the bottom recess of a conventional food serving tray so as to prevent forward sliding movement of said tray with respect to said rack.

10. The carrier of claim 4 further characterized in that the top wall of said container terminates at its forward edge in a forwardly directed ledge extending from side to side of said container, said ledge being closely adjacent to and at least partially overlying the upper edges of said doors when the latter are in closed position.

* * * * *